(12) United States Patent
Hao et al.

(10) Patent No.: US 7,721,369 B2
(45) Date of Patent: May 25, 2010

(54) TRANSITION BOARD APPARATUS FOR A PASSENGER BRIDGE AND A SPRING LEAF THEREOF

(75) Inventors: Shangang Hao, Guangdong (CN); Zhaohong Zhang, Guangdong (CN); Li Han, Guangdong (CN)

(73) Assignee: China International Marine Containers (Group) Ltd., Shenzhen, Guangdong (CN)

( * ) Notice: Subject to any disclaimer, the term of this patent is extended or adjusted under 35 U.S.C. 154(b) by 580 days.

(21) Appl. No.: 11/664,826

(22) PCT Filed: Mar. 14, 2005

(86) PCT No.: PCT/CN2005/000308

§ 371 (c)(1),
(2), (4) Date: Apr. 6, 2007

(87) PCT Pub. No.: WO2005/120952

PCT Pub. Date: Dec. 22, 2005

(65) Prior Publication Data

US 2009/0057491 A1   Mar. 5, 2009

(30) Foreign Application Priority Data

Jun. 8, 2004   (CN) .................. 2004 2 0009094 U

(51) Int. Cl.
E01D 19/00   (2006.01)

(52) U.S. Cl. ....................................... 14/71.1

(58) Field of Classification Search .................. 14/69.5, 14/71.1, 71.3, 71.5
See application file for complete search history.

(56) References Cited

U.S. PATENT DOCUMENTS 937,375 A * 10/1909 Logan .......................... 104/31

(Continued)

FOREIGN PATENT DOCUMENTS

CN           1313227 A       9/2001

(Continued)

OTHER PUBLICATIONS

International Search Report, PCT/CN2005/000308, (Jun. 20, 2005).

*Primary Examiner*—Gary S Hartmann
(74) *Attorney, Agent, or Firm*—Foley & Lardner LLP

(57) ABSTRACT

The invention provides a transition board apparatus for a passenger bridge and a spring leaf thereof. A transition board apparatus includes a transition board and a spring leaf, wherein the transition board comprises a hinged end, a free end and the transition portion between them. The hinged end hinges on the end of the first tunnel bottom plate. The spring leaf is provided with the holding portion, which is secured on the sidewall of the first tunnel, and the bearing portion, which is used to raise the transition board up. Thus, there is a clearance between the free end and the bottom plate ornament laid on the second tunnel bottom plate. Therefore, when the second tunnel is moving back and forth relative to the first tunnel, the friction between the transition board and the bottom ornament can be avoided in order to protect the bottom plate ornament.

8 Claims, 2 Drawing Sheets

U.S. PATENT DOCUMENTS

| | | | | |
|---|---|---|---|---|
| 1,649,877 | A | * | 11/1927 | Walston ........................ 49/273 |
| 2,759,207 | A | * | 8/1956 | Pennington ................. 14/69.5 |
| 3,183,536 | A | * | 5/1965 | Noland ....................... 14/69.5 |
| 3,766,585 | A | * | 10/1973 | Yoon ........................... 14/69.5 |
| 4,443,905 | A | * | 4/1984 | Kopp .......................... 14/69.5 |
| 4,817,224 | A | * | 4/1989 | Visnaw et al. ................ 14/69.5 |
| 5,444,885 | A | * | 8/1995 | Hanrahan et al. ............ 14/69.5 |
| 5,704,086 | A | | 1/1998 | Hansen et al. |
| 6,195,826 | B1 | | 3/2001 | LeBaron et al. |
| 6,543,076 | B1 | | 4/2003 | Worpenberg et al. |
| 6,678,910 | B2 | * | 1/2004 | Smith ......................... 14/69.5 |
| 7,043,790 | B2 | * | 5/2006 | Alexander et al. ........... 14/71.3 |
| 2004/0107520 | A1 | * | 6/2004 | van der Heiden ............ 14/71.1 |

FOREIGN PATENT DOCUMENTS

WO         WO 0188274 A      11/2001

* cited by examiner

TRANSITION BOARD APPARATUS FOR A PASSENGER BRIDGE AND A SPRING LEAF THEREOF

FIELD OF THE INVENTION

The invention relates to a transition board apparatus for a passenger bridge and a spring leaf thereof, and more particularly to a transition board apparatus for a passenger bridge, which is provided with a transition board raising apparatus, and a spring leaf thereof.

BACKGROUND OF THE INVENTION

In a passenger bridge apparatus, there are provided with movable tunnels comprising at least a first tunnel fixedly mounted and a second tunnel movable back and forth relative to the first tunnel. The first tunnel has a rear end hinged to a rotatable platform and a front end extending into and being coupled with the second tunnel via a nylon slider (roller) device so as to enable the second tunnel to move back and forth relative to the first tunnel, thereby realizing a telescopic motion of the tunnels. A transition board is provided in the first tunnel at a transition area between the first and second tunnel, in order to eliminate the effect of the height difference between the two tunnels and seal the clearance between them, thereby improving the aesthetics of its appearance.

A transition board apparatus for a passenger bridge in the prior art is shown in FIG. 1. A hinged end 131 of a transition board 13 is articulated to an end of a first tunnel bottom plate 11 via a hinge 14. The transition board 13 can rotate around the axis of the hinge 14. Provided that a free end 132 of the transition board 13 directly rests on a bottom plate ornament 121 arranged on a second tunnel bottom plate 12, when the second tunnel is moving back and forth relative to the first tunnel, a sliding friction will occur between the free end 132 of the transition board 13 and the bottom plate ornament 121, thus the bottom plate ornament 121 can be worn out. To avoid the above-mentioned occurrence, a pair of elastic support members 15 is soldered on the bottom surface of the first tunnel bottom plate 11. The support members 15 extend to the bottom of the transition board 13. An adjusting bolt 151 is arranged at the end of the support member 15 and used to raise the transition board 13 up, so that the free end 132 of the transition board 13 does not contact with the bottom plate ornament 121. The adjusting bolt 151 can be adjusted as required so as to adjust the distance between the free end 132 of the transition board and the bottom plate ornament 121. This structure can effectively avoid the friction between the free end 132 of the transition board and the bottom plate ornament 121. However, the support members 15 and the adjusting bolts 151, which are located under the transition board, make the adjustment inconvenient. Furthermore, the adjusting bolts 151 are prone to become loose and function less effectively. Therefore, it is necessary to provide an improved tunnel transition board apparatus to overcome the above deficiencies.

SUMMARY OF THE INVENTION

In view of the above technical deficiencies, an object of the present invention is to provide a transition board apparatus for a passenger bridge and a spring leaf thereof, to overcome the problem that the adjusting bolts of the support members in the prior art are inconvenient to be adjusted and are prone to become loose.

To achieve the above object, the present invention provides a transition board apparatus for a passenger bridge comprising a transition board and a raising apparatus, in which the transition board includes a hinged end articulated to an end of a first tunnel bottom plate via a hinge and a free end, wherein the raising apparatus includes at least one spring leaf arranged in the first tunnel, and the spring leaf is provided with a bearing portion extending to a bottom surface of the transition board to raise the transition board up.

In the transition board apparatus as described above, the spring leaf is provided with a holding portion secured to a sidewall of the first tunnel.

In the transition board apparatus as described above, the holding portion is provided with a holding hole, through which the spring leaf is secured to the sidewall with a bolt.

In the transition board apparatus as described above, the holding portion and the bearing portion form an angle of 90 degree therebetween.

In the transition board apparatus as described above, the holding hole is elongated in shape.

In the transition board apparatus as described above, the spring leaf is provided with a bending portion between the holding portion and the bearing portion.

In the transition board apparatus as described above, the bending portion and the holding portion form an obtuse angle therebetween.

In the transition board apparatus as described above, the bending portion and the bearing portion form an obtuse angle therebetween.

In the transition board apparatus as described above, the transition board is, at both sides of its free end, provided with notches each engaged with one spring leaf.

In order to achieve the object of the invention in a better way, the present invention further provides a spring leaf for a transition board apparatus of a passenger bridge, wherein the spring leaf comprises a holding portion for securing and a bearing portion for raising a transition board up.

In the spring leaf as described above, the spring leaf is provided with a bending portion between the holding portion and the bearing portion.

In the spring leaf as described above, the bending portion and the holding portion form an obtuse angle therebetween.

In the spring leaf as described above, the bending portion and the bearing portion form an obtuse angle therebetween.

The present invention has the following technical effects. With the structure described above, the friction between the transition board and the bottom plate ornament can be eliminated when the second tunnel is moving back and forth relative to the first tunnel, since the transition board is raised away from the bottom plate ornament arranged on the second tunnel bottom plate by the bearing portion of the spring leaf. In addition, since the spring leaf is arranged on the sidewall of the first tunnel, it is more convenient to adjust the spring leaf. Moreover, the bearing portion contacts the bottom surface of the transition board over a relatively large area so that it is not susceptible to be damaged.

Hereinafter, the present invention will be described in detail with reference to the accompanying drawings and the embodiment(s), which are given in a non-limiting way.

DETAILED DESCRIPTION OF THE INVENTION

Figure 1:
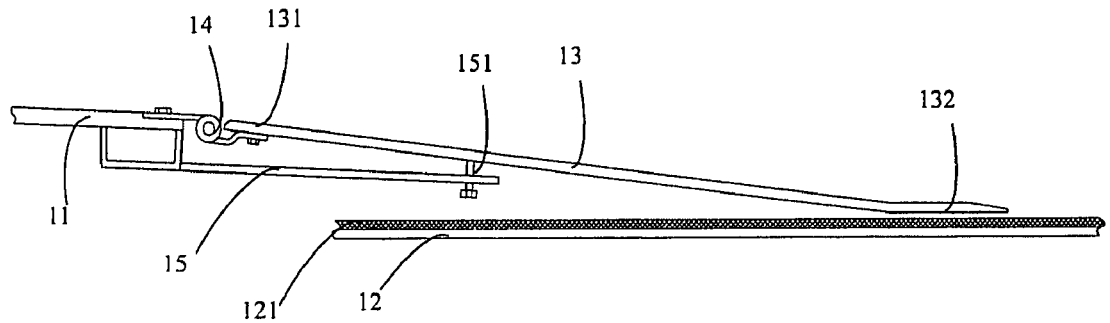
FIG. 1 is a schematic side view of the combination of the transition board apparatus for the passenger bridge and the second tunnel bottom plate with the bottom plate ornament in the prior art.
Figure 2:
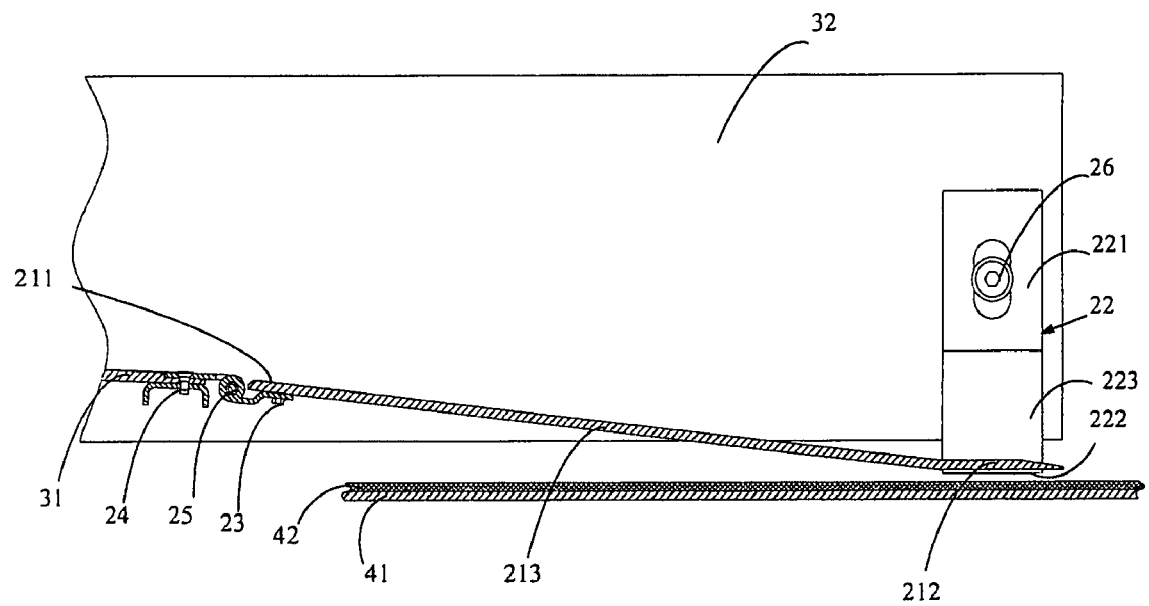
FIG. 2 is a schematic side view of the combination of the transition board apparatus for the passenger bridge and the second tunnel bottom plate with the bottom plate ornament according to the present invention.
Figure 3:
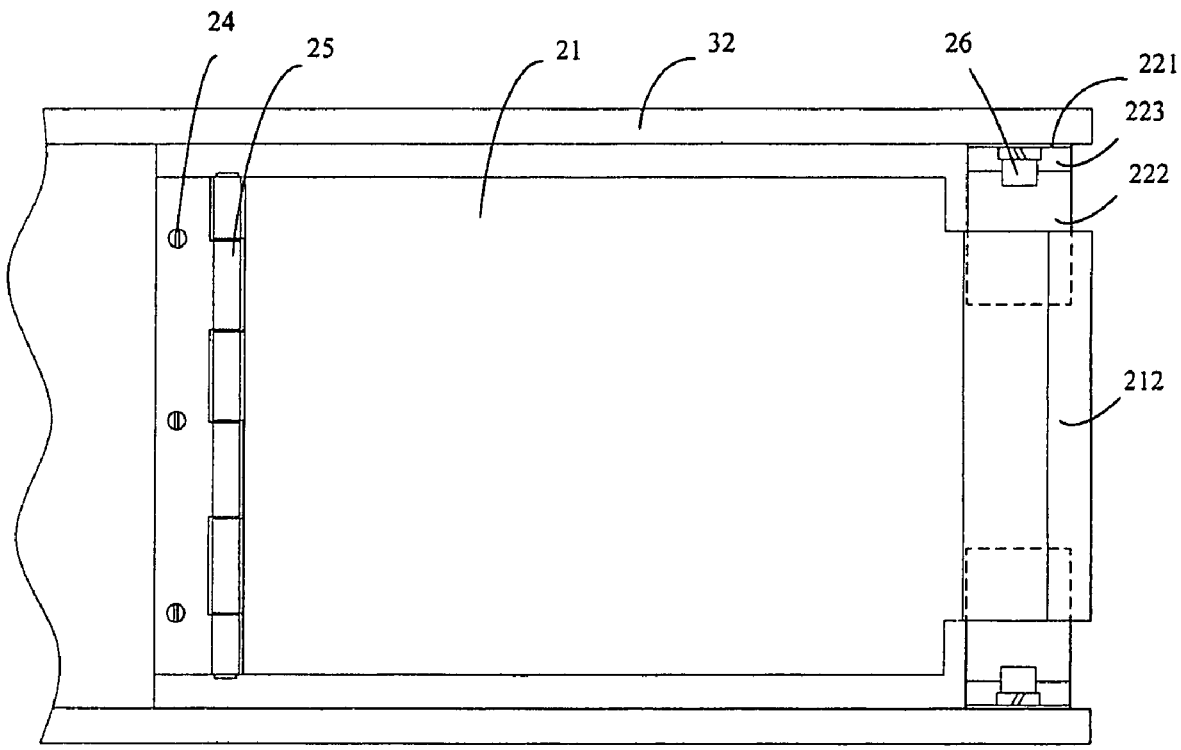
FIG. 3 is a schematic top view of the transition board apparatus for the passenger bridge illustrated in FIG. 2.

Referring to FIGS. 2 and 3, the transition board apparatus for the passenger bridge is comprised of a transition board 21 and two spring leaves 22 symmetrically arranged on both sides of the transition board 21. The transition board 21 comprises a hinged end 211, a free end 212, and a transition portion 213 between the hinged end 211 and the free end 212. The hinged end 211 is connected to one end of the hinge 25 with a screw 23, and the other end of the hinge 25 is secured to a first tunnel bottom plate 31 with a screw 24. In such a manner, the transition board 21 can rotate around the axis of the hinge 25.

Figure 4:
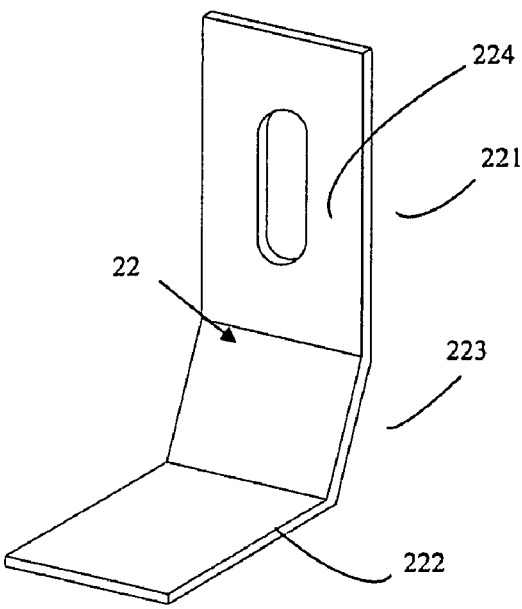
FIG. 4 is a schematic view of the spring leaf of the transition board apparatus for the passenger bridge illustrated in FIG. 2.

Referring to FIGS. 2 and 4, the spring leaf 22 includes a holding portion 221, a bearing portion 222, and a bending portion 223 between the holding portion 221 and the bearing portion 222. The angle formed between the holding portion 221 and the bending portion 223 is an obtuse angle, and the angle formed between the bending portion 223 and the bearing portion 222 is an obtuse angle too. The holding portion 221 and the bearing portion 222 are perpendicular to each other. The holding portion 221 is provided with a holding hole 224 in an elongated shape, through which the spring leaf 22 is secured to a sidewall 32 of the first tunnel with a bolt 26. The bearing portion 222 extends to the bottom surface of the free end 212 of the transition board 21 so as to raise the transition board 21 up, thereby positioning the free end 212 over a bottom plate ornament 42 arranged on a second tunnel bottom plate 41 at a certain distance. In such a case, when the second tunnel is moved relative to the first tunnel, there is no friction between the transition board 21 and the bottom plate ornament 42. When a passenger steps on the transition board 21, the bearing portion 222 of the spring leaf 22 will be pressed against the bottom plate ornament 42 by the free end 212 of the transition board 21. After the passenger passes by, both the bearing portion 222 and the transition board 21 will return to their original positions due to the spring force of the spring leaf 22.

The holding hole 224 is elongated in shape, so that the spring leaf 22 can be adjusted up and down as required to adjust the distance between the free end 212 of the transition board and the bottom plate ornament 42.

The spring leaf 22 is secured to the sidewall 32 of the first tunnel, which makes it to be more conveniently adjusted by the operator. Furthermore, the spring leaf 22 contacts with the bottom surface of the free end 212 of the transition board over a relatively large area, and the bending portion 223 is function as the transition between the bearing portion 222 and the holding portion 221, so that the spring leaf 22 is more secure and not susceptible to be damaged.

Indeed, the present invention can be implemented in many other embodiments. It will be appreciated by those skilled in the art, without departing from the spirit and nature of the present invention, various modifications and variations can be made according to the present invention, and these modifications and variations are intended to fall into the scope of the appended claims.

What is claimed is:

1. A transition board apparatus for a passenger bridge, comprising a transition board and a raising apparatus, in which the transition board includes a hinged end articulated to an end of a first tunnel bottom plate of a first tunnel via a hinge and a free end, wherein the raising apparatus includes at least one spring leaf that is provided with a holding portion secured to a sidewall of the first tunnel, and the spring leaf is provided with a bearing portion extending to a bottom surface of the transition board to raise the transition board up.

2. The transition board apparatus of claim 1, wherein the holding portion is provided with a holding hole, through which the spring leaf is secured to the sidewall with a bolt.

3. The transition board apparatus of claim 1, wherein the holding portion and the bearing portion form an angle of 90 degree therebetween.

4. The transition board apparatus of claim 2, wherein the holding hole is elongated in shape.

5. The transition board apparatus of claim 1, wherein the spring leaf is provided with a bending portion between the holding portion and the bearing portion.

6. The transition board apparatus of claim 5, wherein the bending portion and the holding portion form an obtuse angle therebetween.

7. The transition board apparatus of claim 5, wherein the bending portion and the bearing portion form an obtuse angle therebetween.

8. The transition board apparatus of claim 7, wherein the transition board is, at both sides of the free end, provided with notches each of which is engaged with one spring leaf.

* * * * *